(12) United States Patent
Botzko et al.

(10) Patent No.: US 8,493,862 B2
(45) Date of Patent: Jul. 23, 2013

(54) SYSTEM AND METHOD FOR LOST PACKET RECOVERY WITH CONGESTION AVOIDANCE

(75) Inventors: Stephen Botzko, Reading, MA (US); John Paul Spearman, Austin, TX (US); Richard Flott, Jr., Austin, TX (US); David Hein, Austin, TX (US)

(73) Assignee: Polycom, Inc., San Jose, CA (US)

( * ) Notice: Subject to any disclaimer, the term of this patent is extended or adjusted under 35 U.S.C. 154(b) by 252 days.

(21) Appl. No.: 12/967,787

(22) Filed: Dec. 14, 2010

(65) Prior Publication Data

US 2011/0096776 A1 Apr. 28, 2011

Related U.S. Application Data

(63) Continuation of application No. 12/178,367, filed on Jul. 23, 2008, now Pat. No. 7,876,685.

(60) Provisional application No. 60/951,399, filed on Jul. 23, 2007.

(51) Int. Cl.
 *G06F 11/00* (2006.01)
(52) U.S. Cl.
 USPC .......................................... 370/235; 370/252
(58) Field of Classification Search
 USPC ............... 370/229, 230, 230.1, 231–238, 252
 See application file for complete search history.

(56) References Cited

U.S. PATENT DOCUMENTS

| | | |
|---|---|---|
| 4,894,823 A | 1/1990 | Adelmann et al. |
| 4,935,816 A | 6/1990 | Faber |
| 5,146,477 A | 9/1992 | Cantoni et al. |
| 5,821,984 A | 10/1998 | Ito et al. |
| 5,838,265 A | 11/1998 | Adolph |
| 5,838,664 A | 11/1998 | Polomski |
| 5,889,945 A | 3/1999 | Porter et al. |
| 5,898,457 A | 4/1999 | Nagao et al. |
| 5,917,830 A | 6/1999 | Chen et al. |
| 5,936,662 A | 8/1999 | Kim et al. |
| 5,953,049 A | 9/1999 | Horn et al. |

(Continued)

FOREIGN PATENT DOCUMENTS

| | | |
|---|---|---|
| CN | 1878049 A | 12/2006 |
| EP | 1094630 A2 | 4/2001 |

(Continued)

OTHER PUBLICATIONS

Corresponding U.S. Appl. No. 60/689,083, filed Jun. 10, 2005.

(Continued)

*Primary Examiner* — Kevin Mew
(74) *Attorney, Agent, or Firm* — Wong, Cabello, Lutsch, Rutherford & Brucculeri, L.L.P.

(57) ABSTRACT

Devices and techniques for overcoming lost packets and avoiding congestion when conducting media conferences over packet switched networks are described herein. To avoid the problem of lost packets, redundant information is inserted into the media stream that permits the receiver to reconstruct any lost packets from the redundant information. Congestion avoidance techniques include adjusting the bitrate of the media stream to find the highest bitrate that can be supported without packet loss due to congestion. When increasing the bitrate to a higher rate, the additional bits can come from the redundant information used for lost packet recovery so that any lost packets caused by network congestion will not adversely affect the bitstream.

14 Claims, 5 Drawing Sheets

U.S. PATENT DOCUMENTS

| | | | | |
|---|---|---|---|---|
| 5,982,415 | A | 11/1999 | Sakata | |
| 5,990,933 | A | 11/1999 | Ozone et al. | |
| 5,991,277 | A | 11/1999 | Maeng et al. | |
| 6,006,253 | A | 12/1999 | Kumar et al. | |
| 6,025,870 | A | 2/2000 | Hardy | |
| 6,078,328 | A | 6/2000 | Schumann et al. | |
| 6,104,757 | A | 8/2000 | Rhee | |
| 6,122,259 | A | 9/2000 | Ishida | |
| 6,141,448 | A | 10/2000 | Khansari et al. | |
| 6,175,573 | B1 | 1/2001 | Togo et al. | |
| 6,208,620 | B1* | 3/2001 | Sen et al. | 370/231 |
| 6,215,821 | B1 | 4/2001 | Chen | |
| 6,317,462 | B1 | 11/2001 | Boyce | |
| 6,400,767 | B1 | 6/2002 | Nuber et al. | |
| 6,421,387 | B1 | 7/2002 | Rhee | |
| 6,611,530 | B1 | 8/2003 | Apostolopoulos | |
| 6,629,318 | B1 | 9/2003 | Radha et al. | |
| 6,646,987 | B1* | 11/2003 | Qaddoura | 370/231 |
| 6,680,976 | B1 | 1/2004 | Chen et al. | |
| 6,757,248 | B1* | 6/2004 | Li et al. | 370/235 |
| 6,757,735 | B2 | 6/2004 | Apostolopulos | |
| 6,771,674 | B1* | 8/2004 | Schuster et al. | 370/537 |
| 7,423,983 | B1 | 9/2008 | Li et al. | |
| 7,567,513 | B2 | 7/2009 | Cho | |
| 7,623,521 | B1 | 11/2009 | Wingfield | |
| 7,660,245 | B1 | 2/2010 | Luby | |
| 7,974,195 | B2* | 7/2011 | Jin et al. | 370/231 |
| 8,156,235 | B2* | 4/2012 | Barreto et al. | 709/231 |
| 2001/0009547 | A1 | 7/2001 | Jinzaki et al. | |
| 2002/0018493 | A1* | 2/2002 | Robledo et al. | 370/539 |
| 2002/0116715 | A1 | 8/2002 | Apostolopoulos | |
| 2002/0145972 | A1* | 10/2002 | Windecker | 370/216 |
| 2002/0150048 | A1 | 10/2002 | Ha | |
| 2002/0152440 | A1 | 10/2002 | Yona et al. | |
| 2002/0186724 | A1* | 12/2002 | Bayer et al. | 370/529 |
| 2003/0231589 | A1 | 12/2003 | Itoh et al. | |
| 2004/0001224 | A1* | 1/2004 | Kajiwara | 358/1.15 |
| 2004/0160979 | A1* | 8/2004 | Pepin et al. | 370/462 |
| 2004/0202205 | A1* | 10/2004 | Sheth et al. | 370/539 |
| 2004/0252701 | A1 | 12/2004 | Anadakumar et al. | |
| 2005/0013249 | A1* | 1/2005 | Kong et al. | 370/235 |
| 2005/0111371 | A1 | 5/2005 | Miura | |
| 2005/0195750 | A1 | 9/2005 | Le et al. | |
| 2007/0121506 | A1* | 5/2007 | Wydrowski et al. | 370/231 |
| 2007/0147249 | A1* | 6/2007 | Kumar | 370/235 |
| 2007/0258385 | A1 | 11/2007 | Ku et al. | |
| 2008/0134005 | A1 | 6/2008 | Issat et al. | |
| 2008/0225735 | A1 | 9/2008 | Qiu et al. | |
| 2008/0285476 | A1 | 11/2008 | Rajakarunanayake | |
| 2009/0141631 | A1* | 6/2009 | Kim et al. | 370/235 |

FOREIGN PATENT DOCUMENTS

| | | |
|---|---|---|
| JP | 2004289621 | 10/2004 |
| JP | 2006345523 | 12/2006 |
| WO | 9905602 A1 | 2/1999 |
| WO | 0078000 A2 | 12/2000 |
| WO | 0184731 | 8/2001 |
| WO | 2007070056 A1 | 6/2007 |

OTHER PUBLICATIONS

Japanese Office Action mail date Aug. 9, 2011 received for corresponding Japanese patent application No. 2008-189211.

Tiilikainen; "SIP (RFC 2543), an Implementation for Marratech Pro;" Apr. 2000; Luleå University of Technology, Luleå Sweden.

Willebeek-LeMair et al.; "On Multipoint Control Units for Videoconferencing;" Mar. 1994; IBM T. J. Watson Research Center.

Search Report received in corresponding European Application Seral No. 02751583.2 dated Nov. 23, 2004.

C Shih, Y Tou, C. Shieh: "A Self-Regulated 1,2,6 Redundancy Control Scheme for Wireless Video Transmission" Wireless Network, Communications and Mobile Computing, [Online] Jun. 13, 2005, EX010887998 Retrieved from the Internet: URL:http://ieeexplore.ieee.org/stamp/stamp.jsp?anumber=1549449&isnumber=33022> [retrieved on Mar. 11, 2009].

Search Report received in corresponding European Application Seral No. 08013179.0-1249 dated Mar. 31, 2009.

Seong-Won Yuk et al: "An Adaptive Redundancy Control Method for Erasure-Code-Based Real-Time Data Transmission Over the Internet" Sep. 1, 2001, IEEE Transactions on Multimedia, IEEE Service Center, Piscatway, NJ, US, XPO11036254 ISSN: 1520-9210.

Search Report received in corresponding European Application Serial No. 08013179.0-1249 dated Jun. 23, 2009.

Office Action mail date Jan. 13, 2010 received in corresponding U.S. Appl. No. 12/178,367.

Office Action mail date Jul. 22, 2010 received in corresponding U.S. Appl. No. 12/178,367.

Notice of Allowance and Issue Fee mail date Nov. 4, 2010 received in corresponding U.S. Appl. No. 12/178,367.

Machine translation of Japanese Laid-Open Patent Application No. 2004-289621.

Examination Report (Communication pursuant to Article 94(3) EPC), dated Jan. 5, 2012, received in corresponding European patent application No. 08 013 179.0-1249.

Notification of Second Office Action, dated Feb. 15, 2012, received in corresponding Chinese patent application No. 200810168676.6.

* cited by examiner

SYSTEM AND METHOD FOR LOST PACKET RECOVERY WITH CONGESTION AVOIDANCE

CROSS-REFERENCE TO RELATED APPLICATIONS

This application is a continuation application of U.S. patent application Ser. No. 12/178,367, filed Jul. 23, 2008, entitled "System and Method for Lost Packet Recovery with Congestion Avoidance," which is incorporated by reference in its entirety, and to which priority is claimed. This application also claims the benefit of U.S. Provisional Patent Application Ser. No. 60/951,399, filed Jul. 23, 2007, entitled "System and Method for Lost Packet Recovery with Congestion Avoidance," which is also incorporated by reference in its entirety.

BACKGROUND

Increasingly, videoconferencing systems have begun to use packet-switched networks, such as the Internet, rather than circuit-switched networks, such as PSTN and ISDN. One problem with the use of packet-switched networks for videoconferencing is that all packet-switched networks will experience some degree of packet loss. Video quality is significantly impaired with even a modest packet loss.

Existing solutions to the problem of packet loss include the use of various error concealment techniques and picture refresh mechanisms. Though helpful, these techniques are often inadequate. They also are frequently integrated with specific video codecs, requiring the techniques to be re-invented for each advance in codec technology.

Packet-switched networks typically have at least two fundamental types of packet loss. Physical loss can occur when layers 1 and 2 of networks lose information that is not recovered. This type of loss is more common, for example, when radio links (e.g., WiFi networks such as 802.11a, 802.11b, 802.11g, and 802.11n) are employed. However, physical layer loss can occur on wired and fiber links as well. A second type of packet loss can result from network congestion.

To overcome this second type of packet loss, some videoconferencing devices employ various techniques of congestion avoidance. One such technique is described in U.S. patent application Ser. No. 10/305,485, entitled "System and Method for Dynamic Bandwidth Allocation for Videoconferencing in Lossy Packet Switched Systems," filed Nov. 26, 2002, which is incorporated by reference in its entirety. Such technqiues may be referred to as "Dynamic Bandwidth Allocation" or "DBA." These types of DBA algorithms inherently risk introducing packet loss whenever they attempt to increase the bandwidth, which can result in impaired media. Other types of congestion avoidance techniques include VCON's PacketAssist and other standards relating to either lost packet recovery or congestion control. For instance, RFC 2733 provides a method for lost packet recovery which employs XOR (parity) packets. RFC 3448 provides a method a unicast congestion control, as does RFC 4340.

Additionally, lost data recovery techniques such as forward erasure correction and forward error correction can be employed on layers 1 and 2 of networks. These techniques have also been used with stored media such as RAID disks and CDROMs/DVDs. 3GPP has recently standardized forward erasure correction. Forward error correction can also provided for video streams transmitted via H.320.

Heretofore, there has been no implementation integrating lost packet recovery (e.g., using forward erasure correction) with congestion avoidance. Described herein is an algorithm that includes such integration.

SUMMARY

In one aspect, the present invention relates to a method of preventing disruption of a media stream transmitted across a lossy network. The method can include applying a lost packet recovery algorithm to the media stream. The lost packet recovery mechanism can operate by inserting redundant information into a transmitted data stream that includes the media stream. The redundant information can be generated using forward erasure correction and/or Reed-Solomon encoding. The method can further include applying a congestion avoidance algorithm to the transmitted data stream. The congestion avoidance algorithm can include temporarily increasing a data rate of the transmitted data stream to determine whether the network can support a higher data rate. The data rate can be temporarily increased by increasing the amount of redundant information inserted into the transmitted data stream.

The present invention can also relate to a method of recovering media data received over a lossy network, wherein the media stream was transmitted as part of a data stream comprising the media stream and redundant information. The recovery method can include receiving a plurality of packets containing the media stream and the redundant information and reconstructing lost portions of the media stream from the received packets.

The present invention can also relate to a videoconferencing device adapted to perform data recovery and congestion avoidance as described above.

DETAILED DESCRIPTION

Figure 1:
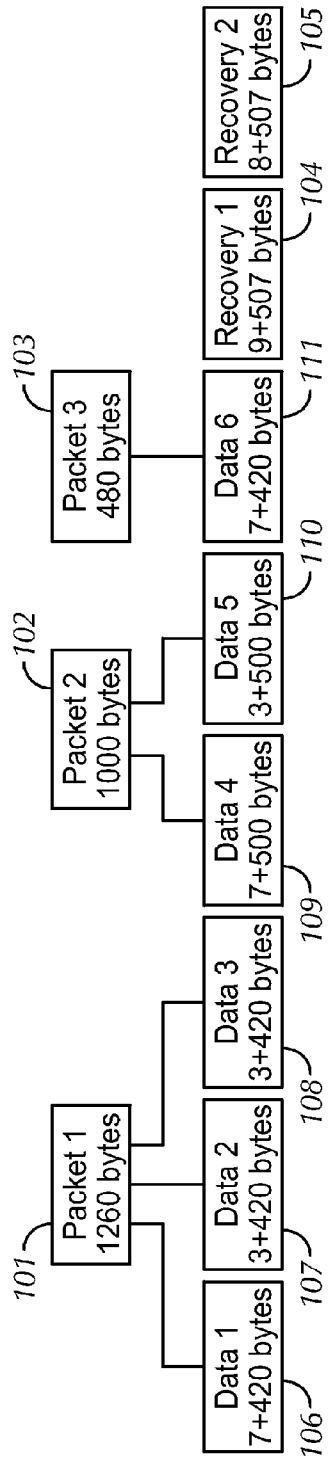
FIG. 1 illustrates a lost packet recovery technique that may be used to protect against packet loss.

Disclosed herein are techniques for overcoming the effect of lost packets in network transmission that combine the use of forward erasure correction and congestion avoidance. These techniques may be referred to as "Lost Packet Recovery" or "LPR."

LPR is a scalable method for recovery of lost RTP media packets. It is not media specific, although the examples described herein are intended for video codecs. LPR techniques described herein can also be used to protect other types of RTP media streams. LPR uses Reed-Solomon encoding to provide forward erasure correction of lost media packets, which allows for recovery of the lost media packets. Other forward erasure codes can also be used.

When LPR is employed the RTP payload is re-packetized to create data packets of approximately equal size. The re-packetized stream uses a distinct RTP dynamic payload type (which differs from the assigned media payload number), and is fully RTP compliant. A payload-specific header includes enough information to reconstruct the original RTP packets. LPR assumes that the SSRC and CSRC information does not change in the middle of a recovery set (as defined below). Timestamps, sequence numbers, the original payload type, and the marker bit are fully recovered, which ensures that the recovered RTP stream can be decrypted.

Recovery packets are then added to this RTP stream. The recovery packets are also RTP compliant. Each recovery packet also includes a payload header that describes the protected data packets. Each packet's RTP payload includes the recovery information.

It should be noted that the LPR protection need not be considered to be part of the overall media bit rate. In some embodiments, only the actual compressed payload is counted as such. The aggregated bit rate can be reduced as necessary to avoid network congestion. It should be understood that network congestion can have undesirable affects other than or in addition to packet loss. For example, network congestion can cause increased media latency and dropped connections (including signaling connections). Therefore, the LPR protocol can have built-in messages for congestion avoidance. One suitable congestion avoidance algorithm is described in greater detail below, although a variety of congestion avoidance algorithms may be used.

An example of LPR applied to a media stream will now be described with reference to FIGS. 1-3. The details of the example, including bit rates, packet loss rates, packet sizes, ratio of data packets to recovery packets, etc. are all mere examples and can vary depending on implementation details, channel conditions, etc.

Consider a 300 kbps video channel that has a packet loss rate of 2%. Three packets 101, 102, and 103 are to be transmitted. An LPR mode of (6+2) can be used, meaning that two recovery packets 104, 105 will be inserted into each group of six data packets 106-111, creating recovery sets of eight packets each. The recovery packets 104, 105 are about equal in size to the largest data packet, but include some additional overhead. The recovery packets allow regeneration of any two of the six data packets 106-111 as described in greater detail below.

To stay within the 300 kbps channel limit, the media rate can be reduced to approximately 220 kbps, leaving 80 kbps for the recovery packets. The target size for each re-packetized data packet can be 500 bytes. Each recovery set therefore carries about 32000 bits of information, representing a time period of 107 ms at the channel rate of 300 kbps. The 107 ms period is called the protection period.

Each of the packets (i.e., the re-packetized data packets 106-111 and the recovery packets 104, 105) contains the typical 40 bytes of IP+UDP+RTP header overhead. For simplicity, this overhead is not shown. However, the overhead associated with LPR itself is shown. For example, "3+420" indicates that three overhead bytes plus 420 bytes of the original data are in the packet. The recovery packets are 100% overhead. The details of the overhead are described in greater detail below.

Figure 2:
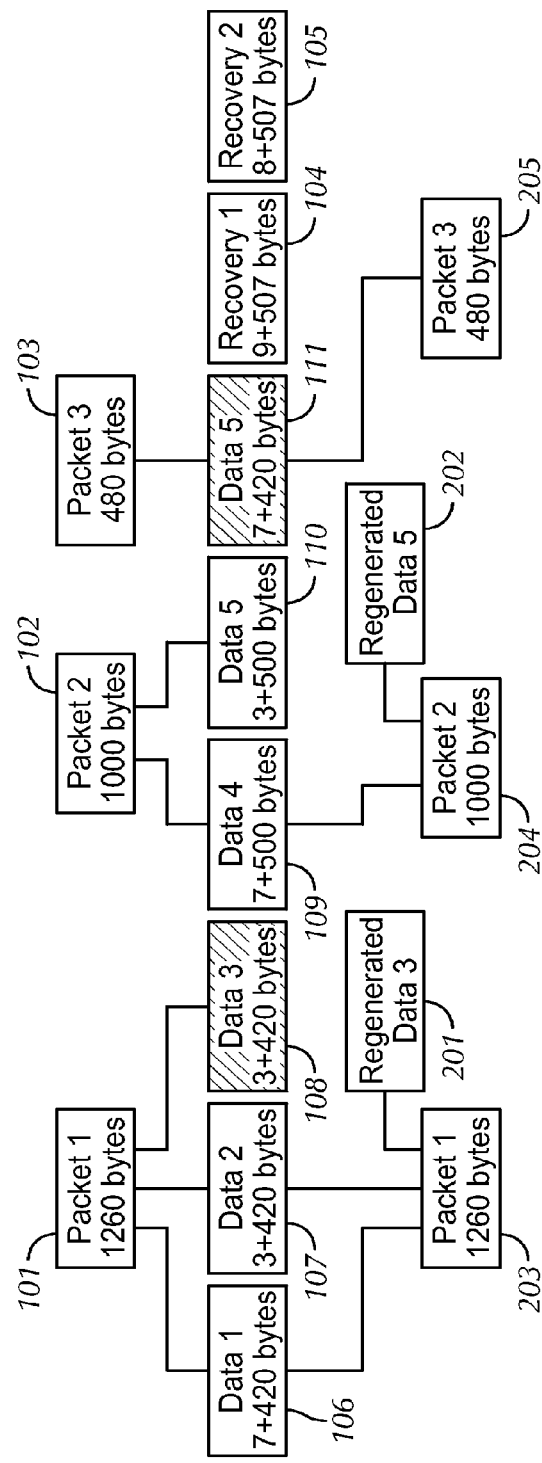
FIG. 2 illustrates a lost packet recovery technique in which certain packets are lost and the data is reconstructed.

FIG. 2 illustrates the recovery process. Assume that data packets 3 and 5 (108, 110) are lost. The LPR decoder creates regenerated packets 201 and 202 from the six packets that were received, i.e., data packets 1, 2, 4, and 6 and recovery packets 1 and 2. Note that regeneration of the lost packets cannot occur until the sixth packet is received. After regeneration, the original RTP packets 203-205 are restored from the data packets. Regeneration of the lost packets is described in greater detail below.

Figure 3:
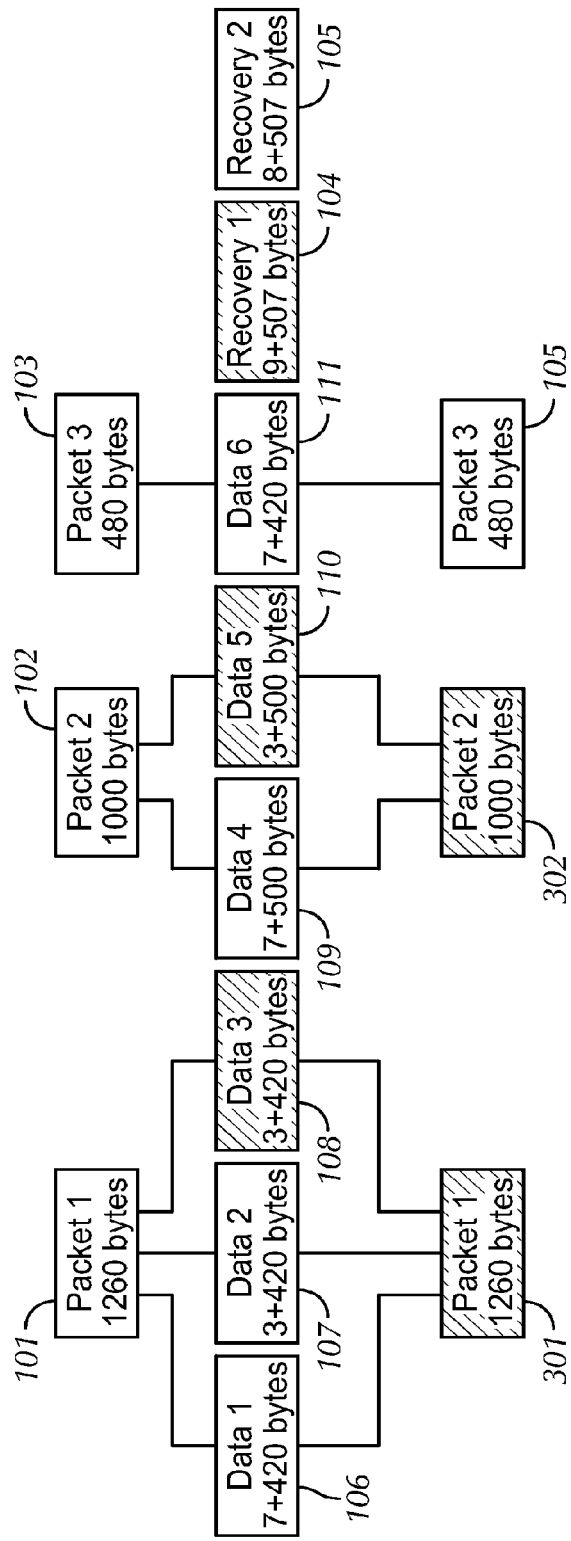
FIG. 3 illustrates a lost packet recovery technique in which certain packets are lost and the data is reconstructed.

FIG. 3 illustrates a failed packet recovery where more than two packets are lost. In this example Recovery Packet 1 is lost as well as Data Packets 3 and 5. Since only 5 packets of the group were received, packet regeneration is not possible. The LPR decoder does not regenerate partial packets. If the original packet can not be recovered in its entirety, then the partial packet information is discarded. Therefore, data packets 1 and 2, 301, 302 are both shown as lost.

In the event that all of the original data packets cannot be recovered, as illustrated in FIG. 3, it is typical for the receiving decoder to request a fast update of the entire image. Alternatively, a walk-around refresh such as that described in U.S. Pat. No. 7,020,203, entitled "Dynamic Intra-coded Macroblock Refresh Interval for Video Error Concealment," issued Mar. 28, 2006, which is hereby incorporated by reference in its entirety. It is also possible to send periodic I-frames or IDR recovery points to systematically refresh the image.

For the given example of a channel at 300 kbps and 2% packet loss, with each protection set of six data packets and two recovery data packets covering 107 ms of channel data, the mean time between failures can be computed to be approximately 258 seconds. Assuming that a fast update requires approximately two seconds, the video transmitted on a channel protected by the LPR example given will be error-free more than 99% of the time. This protection comes at an additional overhead of 80 kbps, which is approximately 30% of the channel rate.

Figure 4:
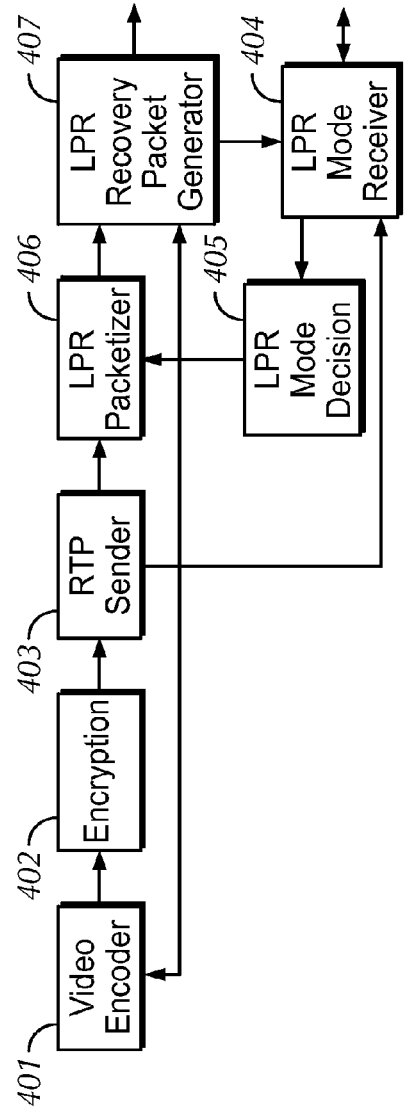
FIG. 4 illustrates a lost packet recovery encoder.

Additional aspects of the LPR example given above may be better understood with reference to FIG. 4, which illustrates an implementation of an LPR encoder. Variations of this implementation are also possible. Video encoder 401 can be any of a variety of video encoders operating in a more or less conventional matter. For example, the video encoder can operate according to the H.261, H.263, H.264, MPEG-2, or MPEG-4 video compression standards. Alternatively, the video encoder can operate according to any of a variety of proprietary video coding techniques.

The output of video encoder 401 can be supplied to optional encryption module 402, which can also be of any of a variety of known types. The encrypted video data (or unencrypted video data, if encryption is not used) can be supplied to RTP sender 403, which can also be conventional. The RTP packets generated by RTP sender 403 can then be re-packetized using the LPR algorithm by LPR packetizer 406 as described in greater detail below. LPR recovery packet generator 407 can then generate the recovery packets based on information received from LPR packetizer 406 and video encoder 401, as described in greater detail below. The LPR recovery packet generator can then transmit the LPR data packets and the LPR recovery packets to the receiver (not shown). Encryption could also be performed on the output of the LPR recovery packet generator.

LPR Mode Receiver 404 can receive packet loss and other channel statistics (via RTCP reports or other means) and supply these to LPR mode decision module 405, which controls LPR packetizer 406. Alternatively, the protection requirement can be sent to the transmitter using other messages. LPR mode decision module 405 can decide whether to engage or disengage LPR protection, as well as determine the LPR protection parameters to be used. If LPR protection is disengaged, LPR packetizer 406 and LPR recovery packet generator 407 can pass through the RTP packets generated by RTP sender 403 without alteration.

LPR mode decision module 405 can operate as follows. First the protection period (as described above) can be determined. Longer protection periods offer more efficient packet regeneration (e.g., fewer recovery kbps), but create more latency. For most typical videoconferencing bit rates, 100 ms can be a suitable protection period. At bit rates below 128 Kbps longer protection periods might be necessary. For example, 150 ms can be suitable for a 64 Kbps rate. At bit rates above 1 Mbps shorter protection periods might be advantageous. For example, 50 ms can be suitable for rates of 2 Mbps or more. The protection period can also be aligned with the start of a video frame, and end with the last packet in a either the same or a subsequent video frame. Other parameters can also be considered in determining the protection period.

Next, the number of total packets per protection period can be determined. In general, small numbers of packets per protection period may tend to decrease the efficiency of the protection. Conversely, larger numbers of packets per protection period may tend to increase the amount of computation required to encode and decode the protection packets. The decision on the number of packets per protection period should also take into account the resulting packet size for the desired data rate. The output packet size (including IP overhead) should be less than 1260 bytes to traverse an IPSEC tunnel without fragmentation. Other packet size limits might be suitable for other protocols.

Once the number of packets per protection period is established, the number of recovery packets per protection period can be chosen. The number of recovery packets can be chosen (using conventional probabilistic analysis techniques) so that the mean time between protection breakdowns meets or exceeds a predetermined specified value. Additionally, the aggregation of all transmitted video channels (including the LPR protection packets and RTP messages) can be selected so as not to exceed a specified congestion ceiling.

The tables below give example protection modes that can be used for various bitrates under various loss conditions. Table 1 gives LPR parameters that may be suitable for 4% packet loss conditions that can be used in conjunction with congestion avoidance algorithms (as described below) that reduce the data rate when packet loss exceeds 3%. Table 2 gives LPR parameters for 2% packet loss conditions that may be used when congestion avoidance algorithms are not in use.

TABLE 1

Constant Protection at 4% Packet Loss

| Video Rate (k\bs) | Data Packets Per Group | Packet Payload Size (bytes) | Recovery Packets Per Group | Protection Period (ms) | MTBF (sec) |
|---|---|---|---|---|---|
| 64 | 13 | 87 | 4 | 141 | 334 |
| 128 | 12 | 133 | 4 | 100 | 323 |
| 256 | 12 | 266 | 4 | 100 | 323 |
| 384 | 12 | 400 | 4 | 100 | 324 |
| 512 | 12 | 533 | 4 | 100 | 324 |
| 768 | 12 | 800 | 4 | 100 | 324 |
| 1024 | 16 | 800 | 5 | 100 | 757 |
| 2048 | 16 | 800 | 5 | 50 | 379 |
| 3072 | 24 | 800 | 6 | 50 | 338 |
| 4096 | 32 | 800 | 7 | 50 | 378 |
| 5120 | 32 | 1000 | 7 | 50 | 378 |
| 6144 | 39 | 1000 | 8 | 51 | 567 |

TABLE 2

Constant Protection at 2% Packet Loss

| Video Rate (k\bs) | Data Packets Per Group | Packet Payload Size (bytes) | Recovery Packets Per Group | Protection Period (ms) | MTBF (sec) |
|---|---|---|---|---|---|
| 64 | 13 | 87 | 3 | 141 | 589 |
| 128 | 12 | 133 | 3 | 100 | 545 |
| 256 | 12 | 266 | 3 | 100 | 545 |
| 384 | 12 | 400 | 3 | 100 | 546 |
| 512 | 12 | 533 | 3 | 100 | 546 |
| 768 | 12 | 800 | 3 | 100 | 546 |
| 1024 | 16 | 800 | 4 | 100 | 2591 |
| 2048 | 16 | 800 | 4 | 50 | 1296 |
| 3072 | 24 | 800 | 5 | 50 | 2444 |
| 4096 | 32 | 800 | 5 | 50 | 573 |
| 5120 | 32 | 1000 | 5 | 50 | 573 |
| 6144 | 39 | 1000 | 6 | 51 | 1704 |

LPR packetizer 406 can operate as follows. LPR packetizer 406 sub-divides the original media packets generated by RTP sender 403 so as to improve the efficiency of packet regeneration coding. An LPR data packet contains information from only one source packet. If the media channel is encrypted, LPR re-packetization can be performed on the encrypted stream. In general, the LPR stream itself is not re-encrypted, i.e., the LPR encapsulation fields (headers) added to the encrypted packets and newly generated LPR recovery packets are sent in the clear.

If an original source packet is sub-divided (e.g., Packet 1 101 in FIGS. 1-3), the first LPR data packet for this source packet is called the initial data packet (e.g., Data 1 106 in FIGS. 1-3). Subsequent data packets (if any) are called follow-on data packets (e.g., Data 2 107 and Data 3 108 in FIGS. 1-3). The number of follow-on data packets is signaled in the initial data packet and therefore cannot be changed once the initial data packet is sent. The follow-on data packets and the initial data packet may be in different LPR protection groups.

All fields in the original RTP header except for the sequence number, the payload type, and the P field can be carried unchanged in each LPR data packet. This includes the time stamp, the marker bit, and the SSRC/CSRC information. The payload number can be replaced with the negotiated LPR payload type. Sequence numbers can be assigned sequentially to the LPR media stream in the usual fashion. The P field of the LPR packet can be set to 0. LPR packetizer 406 can pass through the original RTP sequence numbers to LPR recovery packet generator 407.

Figure 5:
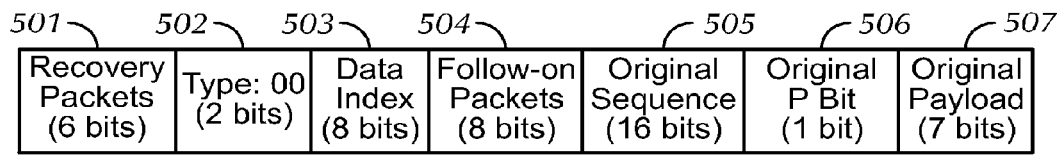
FIGS. 5-9 illustrate packet headers that can be used in conjunction with the lost packet recovery techniques and encoders of FIGS. 1-4.
Figure 6:
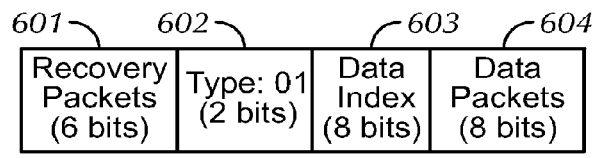

Each initial data packet can include a seven-byte payload header that is specific to LPR, an example of which is illustrated in FIG. 5. Each follow-on data packet can include a three-byte payload header, an example of which is illustrated in FIG. 6. These payload headers can immediately follow the RTP header and precede the video (or other media) payload. The header sizes and individual field sizes and their arrangement are exemplary only, and it will be understood that other arrangements are possible.

The recovery packet field 501, 601 can be used to indicate the number of recovery packets that will subsequently be sent in the recovery set. All data packets in a recovery set should signal the same number of recovery packets. The number of recovery packets signaled can be 0, indicating that no recovery packets will be sent. This field can be a six-bit field, which would allow for up to sixty-four recovery packets. The type field 502, 602 can be a two-bit field set to either 00 or 01 to indicate an initial data packet or a follow-on data packet, respectively. This allows the header type for LPR to be determined by examining the first payload byte.

Data index field 503, 603 can be an 8-bit field. The first data packet in a recovery set can be assigned a data index of 1. The index can be incremented for subsequent data packets in the set. The follow-on packets field 504 can be an 8-bit field used to specify the number of follow-on packets associated with the initial packet. The data packet field 604 can be an eight-bit field used to signal the number of data packets included in the recovery set. All data packets should signal the same number of data packets.

Original sequence field 505 can be a sixteen-bit field that indicates the original RTP packet sequence number, which will be used to recreate the original RTP packets. Original p-bit field 506 can be a one-bit field used to carry the padding bit carried by the original RTP packet. Original payload type field 507 can be a seven-bit field used to carry the payload type as carried by the original RTP packet.

LPR recovery packet generator 407 can operate as follows. LPR recovery packet generator 407 can replace the RTP sequence numbers of the original media with the final LPR sequence numbers in the LPR data packets. LPR recovery packet generator 407 can also insert the LPR recovery packets at the end of each recovery set.

Figure 7:
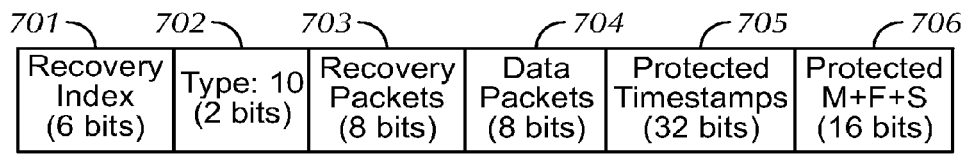

Each recovery packet can also include a nine-byte header such as that illustrated in FIG. 7. The recovery packet header can immediately follows the RTP header and can precede the video (or other media) payload. As with the header described above, the field types and sizes are exemplary and other arrangements may also be used.

Recovery index field 701 can be a six-bit field used to indicate the sequence of the recovery packet in the recovery set. The first recovery packet can be assigned a recovery index of 1, which can be incremented for subsequent recovery packets in the recovery set. Type field 702 can be a two-bit field set to 10 to indicate the packet is a recovery packet. The recovery packets field can be an eight-bit field that includes the number of data packets in the recovery set. All recovery packets should signal the same number of recovery packets signalled by the corresponding data packets. Data packets field 704 can be an eight-bit field that indicates the number of data packets sent in the recovery set. The recovery packets should indicate the same number of data packets indicated in the corresponding data packets.

Protected timestamps field 705 can be a 32 bit field that holds Reed-Solomon encoded RTP timestamps for each data packet in the recovery set. This can combined using the same Reed-Solomon encoding as used in the recovery payload itself. This field can allow the RTP timestamp of a missing data packet to be regenerated. The 4 bytes are in network order.

Figure 8:
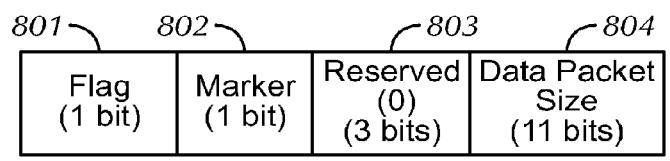

Protected marker, flag, and size field 706 (further illustrated in FIG. 8) can hold the Reed-Solomon encoded RTP marker bit 802, a flag value 801, and data packet size 803. The flag value can be 1 if the LPR data packet is an initial packet, and can be set to 0 if the LPR data packet is a follow-on packet. The size can include the IP, UDP, and RTP header as well as the LPR header. The data packet size can be in network order.

The protected field is combined using the same Reed-Solomon encoding as is used in the recovery payload itself. The field allows the LPR header type, marker and data packet size to be regenerated for any missing data packet that can be recovered.

The payload of the recovery packet can be encoded using Reed-Solomon 256 (RS256) encoding. The Original Sequence 505, Original P bit 506, Original Payload Type 507 and Follow-on Packets 504 fields in the initial data packet can be protected as if they were payload bytes. This can allow this information to be recovered if the initial data packet is lost. Additionally, the recovery packet payload header can include encodings of three Phantom Data fields: the length of the data packet itself, the marker bit, and the timestamp. Again, this can allow this information to be recovered if all data packets for a sub-divided RTP packet are lost.

Each payload byte in each data packet can contribute to the corresponding byte in each recovery packet, according to the generating function for RS256:

$$R_j = \sum_{i=1}^{d} B_i^{j-1} \otimes D_i$$

where: Di is the ith data packet ($1 \leq i \leq d$); Rj is the jth recovery packet ($1 \leq j \leq r$); Bi is the ith base coefficient ($1 \leq i \leq d$) having values as specified in table 3; and $B_i^{j-1}, \otimes, \Sigma$ are computed using Galois Field ($2^8$) arithmetic operations as described below. It should be noted that the given base coefficient table restricts the maximum number of data packets in a recovery set to 128, although other numbers of data packets can be selected, and a suitable table can be computed accordingly.

TABLE 3

RS256 Base Coefficients

```
/*
** RS256_BaseTable[i] holds the base coefficient for data packet i−1
**
** These entries are selected to ensure that the dispersal matrix is
** invertible. Each entry b is chosen so b**x is not 1 unless x is 0 or 255.
*/
#define RS256_BASETABLE_LEN 128
STATIC CONST UINT8
RS256_BaseTable[RS256_BASETABLE_LEN]= {
  0x02, 0x04, 0x06, 0x09, 0x0D, 0x0E, 0x10, 0x12,
  0x13, 0x14, 0x16, 0x18, 0x19, 0x1B, 0x1D, 0x1E,
  0x1F, 0x22, 0x23, 0x28, 0x2A, 0x2B, 0x30, 0x31,
  0x32, 0x34, 0x39, 0x3C, 0x3F, 0x41, 0x42, 0x43,
  0x47, 0x48, 0x49, 0x4A, 0x4B, 0x4C, 0x51, 0x52,
  0x53, 0x54, 0x58, 0x5A, 0x5B, 0x5C, 0x5D, 0x5F,
  0x62, 0x63, 0x68, 0x69, 0x6D, 0x6F, 0x70, 0x71,
  0x76, 0x77, 0x79, 0x7A, 0x7B, 0x7E, 0x80, 0x81,
  0x83, 0x85, 0x87, 0x88, 0x89, 0x8C, 0x8D, 0x8E,
  0x90, 0x94, 0x95, 0x97, 0x9A, 0x9B, 0x9D, 0x9E,
  0x9F, 0xA2, 0xA3, 0xA4, 0xA5, 0xAA, 0xAB, 0xAF,
  0xB0, 0xB1, 0xB2, 0xB7, 0xBB, 0xBC, 0xBD, 0xC0,
  0xC2, 0xC6, 0xC7, 0xC8, 0xC9, 0xCA, 0xCB, 0xCC,
  0xD1, 0xD2, 0xD3, 0xD4, 0xD5, 0xD8, 0xDA, 0xDE,
  0xE0, 0xE1, 0xE3, 0xE5, 0xE8, 0xEA, 0xEC, 0xEE,
  0xF0, 0xF3, 0xF6, 0xF7, 0xF8, 0xF9, 0xFA, 0xFE
};
```

Galois field ($2^8$) arithmetic operations can be set up to use two helper tables: a Galois Log function (glog) table, and a Galois Exponentiation function (gexp) table. These tables are:

TABLE 4

Galois Log Helper Function

```
unsigned short glog[256] = {
  0x200, 0x00, 0x01, 0x19, 0x02, 0x32, 0x1A, 0xC6,   /* 0 to 7 */
  0x03, 0xDF, 0x33, 0xEE, 0x1B, 0x68, 0xC7, 0x4B,    /* 8 to 15 */
  0x04, 0x64, 0xE0, 0x0E, 0x34, 0x8D, 0xEF, 0x81,    /* 16 to 23 */
  0x1C, 0xC1, 0x69, 0xF8, 0xC8, 0x08, 0x4C, 0x71,    /* 24 to 31 */
  0x05, 0x8A, 0x65, 0x2F, 0xE1, 0x24, 0x0F, 0x21,    /* 32 to 39 */
  0x35, 0x93, 0x8E, 0xDA, 0xF0, 0x12, 0x82, 0x45,    /* 40 to 47 */
  0x1D, 0xB5, 0xC2, 0x7D, 0x6A, 0x27, 0xF9, 0xB9,    /* 48 to 55 */
  0xC9, 0x9A, 0x09, 0x78, 0x4D, 0xE4, 0x72, 0xA6,    /* 56 to 63 */
```

TABLE 4-continued

Galois Log Helper Function

| | |
|---|---|
| 0x06, 0xBF, 0x8B, 0x62, 0x66, 0xDD, 0x30, 0xFD, | /* 64 to 71 */ |
| 0xE2, 0x98, 0x25, 0xB3, 0x10, 0x91, 0x22, 0x88, | /* 72 to 79 */ |
| 0x36, 0xD0, 0x94, 0xCE, 0x8F, 0x96, 0xDB, 0xBD, | /* 80 to 87 */ |
| 0xF1, 0xD2, 0x13, 0x5C, 0x83, 0x38, 0x46, 0x40, | /* 88 to 95 */ |
| 0x1E, 0x42, 0xB6, 0xA3, 0xC3, 0x48, 0x7E, 0x6E, | /* 96 to 103 */ |
| 0x6B, 0x3A, 0x28, 0x54, 0xFA, 0x85, 0xBA, 0x3D, | /* 104 to 111 */ |
| 0xCA, 0x5E, 0x9B, 0x9F, 0x0A, 0x15, 0x79, 0x2B, | /* 112 to 119 */ |
| 0x4E, 0xD4, 0xE5, 0xAC, 0x73, 0xF3, 0xA7, 0x57, | /* 120 to 127 */ |
| 0x07, 0x70, 0xC0, 0xF7, 0x8C, 0x80, 0x63, 0x0D, | /* 128 to 135 */ |
| 0x67, 0x4A, 0xDE, 0xED, 0x31, 0xC5, 0xFE, 0x18, | /* 136 to 143 */ |
| 0xE3, 0xA5, 0x99, 0x77, 0x26, 0xB8, 0xB4, 0x7C, | /* 144 to 151 */ |
| 0x11, 0x44, 0x92, 0xD9, 0x23, 0x20, 0x89, 0x2E, | /* 152 to 159 */ |
| 0x37, 0x3F, 0xD1, 0x5B, 0x95, 0xBC, 0xCF, 0xCD, | /* 160 to 167 */ |
| 0x90, 0x87, 0x97, 0xB2, 0xDC, 0xFC, 0xBE, 0x61, | /* 168 to 175 */ |
| 0xF2, 0x56, 0xD3, 0xAB, 0x14, 0x2A, 0x5D, 0x9E, | /* 176 to 183 */ |
| 0x84, 0x3C, 0x39, 0x53, 0x47, 0x6D, 0x41, 0xA2, | /* 184 to 191 */ |
| 0x1F, 0x2D, 0x43, 0xD8, 0xB7, 0x7B, 0xA4, 0x76, | /* 192 to 199 */ |
| 0xC4, 0x17, 0x49, 0xEC, 0x7F, 0x0C, 0x6F, 0xF6, | /* 200 to 207 */ |
| 0x6C, 0xA1, 0x3B, 0x52, 0x29, 0x9D, 0x55, 0xAA, | /* 208 to 215 */ |
| 0xFB, 0x60, 0x86, 0xB1, 0xBB, 0xCC, 0x3E, 0x5A, | /* 216 to 223 */ |
| 0xCB, 0x59, 0x5F, 0xB0, 0x9C, 0xA9, 0xA0, 0x51, | /* 224 to 231 */ |
| 0x0B, 0xF5, 0x16, 0xEB, 0x7A, 0x75, 0x2C, 0xD7, | /* 232 to 239 */ |
| 0x4F, 0xAE, 0xD5, 0xE9, 0xE6, 0xE7, 0xAD, 0xE8, | /* 240 to 247 */ |
| 0x74, 0xD6, 0xF4, 0xEA, 0xA8, 0x50, 0x58, 0xAF | /* 248 to 255 */ |
| }; | |

TABLE 5

Galois Exponentiation Helper Function

| | |
|---|---|
| unsigned char gexp[1065] = { | |
| 0x01, 0x02, 0x04, 0x08, 0x10, 0x20, 0x40, 0x80, | /* 0 to 7 */ |
| 0x1D, 0x3A, 0x74, 0xE8, 0xCD, 0x87, 0x13, 0x26, | /* 8 to 15 */ |
| 0x4C, 0x98, 0x2D, 0x5A, 0xB4, 0x75, 0xEA, 0xC9, | /* 16 to 23 */ |
| 0x8F, 0x03, 0x06, 0x0C, 0x18, 0x30, 0x60, 0xC0, | /* 24 to 31 */ |
| 0x9D, 0x27, 0x4E, 0x9C, 0x25, 0x4A, 0x94, 0x35, | /* 32 to 39 */ |
| 0x6A, 0xD4, 0xB5, 0x77, 0xEE, 0xC1, 0x9F, 0x23, | /* 40 to 47 */ |
| 0x46, 0x8C, 0x05, 0x0A, 0x14, 0x28, 0x50, 0xA0, | /* 48 to 55 */ |
| 0x5D, 0xBA, 0x69, 0xD2, 0xB9, 0x6F, 0xDE, 0xA1, | /* 56 to 63 */ |
| 0x5F, 0xBE, 0x61, 0xC2, 0x99, 0x2F, 0x5E, 0xBC, | /* 64 to 71 */ |
| 0x65, 0xCA, 0x89, 0x0F, 0x1E, 0x3C, 0x78, 0xF0, | /* 72 to 79 */ |
| 0xFD, 0xE7, 0xD3, 0xBB, 0x6B, 0xD6, 0xB1, 0x7F, | /* 80 to 87 */ |
| 0xFE, 0xE1, 0xDF, 0xA3, 0x5B, 0xB6, 0x71, 0xE2, | /* 88 to 95 */ |
| 0xD9, 0xAF, 0x43, 0x86, 0x11, 0x22, 0x44, 0x88, | /* 96 to 103 */ |
| 0x0D, 0x1A, 0x34, 0x68, 0xD0, 0xBD, 0x67, 0xCE, | /* 104 to 111 */ |
| 0x81, 0x1F, 0x3E, 0x7C, 0xF8, 0xED, 0xC7, 0x93, | /* 112 to 119 */ |
| 0x3B, 0x76, 0xEC, 0xC5, 0x97, 0x33, 0x66, 0xCC, | /* 120 to 127 */ |
| 0x85, 0x17, 0x2E, 0x5C, 0xB8, 0x6D, 0xDA, 0xA9, | /* 128 to 135 */ |
| 0x4F, 0x9E, 0x21, 0x42, 0x84, 0x15, 0x2A, 0x54, | /* 136 to 143 */ |
| 0xA8, 0x4D, 0x9A, 0x29, 0x52, 0xA4, 0x55, 0xAA, | /* 144 to 151 */ |
| 0x49, 0x92, 0x39, 0x72, 0xE4, 0xD5, 0xB7, 0x73, | /* 152 to 159 */ |
| 0xE6, 0xD1, 0xBF, 0x63, 0xC6, 0x91, 0x3F, 0x7E, | /* 160 to 167 */ |
| 0xFC, 0xE5, 0xD7, 0xB3, 0x7B, 0xF6, 0xF1, 0xFF, | /* 168 to 175 */ |
| 0xE3, 0xDB, 0xAB, 0x4B, 0x96, 0x31, 0x62, 0xC4, | /* 176 to 183 */ |
| 0x95, 0x37, 0x6E, 0xDC, 0xA5, 0x57, 0xAE, 0x41, | /* 184 to 191 */ |
| 0x82, 0x19, 0x32, 0x64, 0xC8, 0x8D, 0x07, 0x0E, | /* 192 to 199 */ |
| 0x1C, 0x38, 0x70, 0xE0, 0xDD, 0xA7, 0x53, 0xA6, | /* 200 to 207 */ |
| 0x51, 0xA2, 0x59, 0xB2, 0x79, 0xF2, 0xF9, 0xEF, | /* 208 to 215 */ |
| 0xC3, 0x9B, 0x2B, 0x56, 0xAC, 0x45, 0x8A, 0x09, | /* 216 to 223 */ |
| 0x12, 0x24, 0x48, 0x90, 0x3D, 0x7A, 0xF4, 0xF5, | /* 224 to 231 */ |
| 0xF7, 0xF3, 0xFB, 0xEB, 0xCB, 0x8B, 0x0B, 0x16, | /* 232 to 239 */ |
| 0x2C, 0x58, 0xB0, 0x7D, 0xFA, 0xE9, 0xCF, 0x83, | /* 240 to 247 */ |
| 0x1B, 0x36, 0x6C, 0xD8, 0xAD, 0x47, 0x8E, 0x01, | /* 248 to 255 */ |
| 0x02, 0x04, 0x08, 0x10, 0x20, 0x40, 0x80, 0x1D, | /* 256 to 263 */ |
| 0x3A, 0x74, 0xE8, 0xCD, 0x87, 0x13, 0x26, 0x4C, | /* 264 to 271 */ |
| 0x98, 0x2D, 0x5A, 0xB4, 0x75, 0xEA, 0xC9, 0x8F, | /* 272 to 279 */ |
| 0x03, 0x06, 0x0C, 0x18, 0x30, 0x60, 0xC0, 0x9D, | /* 280 to 287 */ |
| 0x27, 0x4E, 0x9C, 0x25, 0x4A, 0x94, 0x35, 0x6A, | /* 288 to 295 */ |
| 0xD4, 0xB5, 0x77, 0xEE, 0xC1, 0x9F, 0x23, 0x46, | /* 296 to 303 */ |
| 0x8C, 0x05, 0x0A, 0x14, 0x28, 0x50, 0xA0, 0x5D, | /* 304 to 311 */ |
| 0xBA, 0x69, 0xD2, 0xB9, 0x6F, 0xDE, 0xA1, 0x5F, | /* 312 to 319 */ |
| 0xBE, 0x61, 0xC2, 0x99, 0x2F, 0x5E, 0xBC, 0x65, | /* 320 to 327 */ |
| 0xCA, 0x89, 0x0F, 0x1E, 0x3C, 0x78, 0xF0, 0xFD, | /* 328 to 335 */ |
| 0xE7, 0xD3, 0xBB, 0x6B, 0xD6, 0xB1, 0x7F, 0xFE, | /* 336 to 343 */ |
| 0xE1, 0xDF, 0xA3, 0x5B, 0xB6, 0x71, 0xE2, 0xD9, | /* 344 to 351 */ |
| 0xAF, 0x43, 0x86, 0x11, 0x22, 0x44, 0x88, 0x0D, | /* 352 to 359 */ |
| 0x1A, 0x34, 0x68, 0xD0, 0xBD, 0x67, 0xCE, 0x81, | /* 360 to 367 */ |
| 0x1F, 0x3E, 0x7C, 0xF8, 0xED, 0xC7, 0x93, 0x3B, | /* 368 to 375 */ |
| 0x76, 0xEC, 0xC5, 0x97, 0x33, 0x66, 0xCC, 0x85, | /* 376 to 383 */ |
| 0x17, 0x2E, 0x5C, 0xB8, 0x6D, 0xDA, 0xA9, 0x4F, | /* 384 to 391 */ |
| 0x9E, 0x21, 0x42, 0x84, 0x15, 0x2A, 0x54, 0xA8, | /* 392 to 399 */ |
| 0x4D, 0x9A, 0x29, 0x52, 0xA4, 0x55, 0xAA, 0x49, | /* 400 to 407 */ |
| 0x92, 0x39, 0x72, 0xE4, 0xD5, 0xB7, 0x73, 0xE6, | /* 408 to 415 */ |
| 0xD1, 0xBF, 0x63, 0xC6, 0x91, 0x3F, 0x7E, 0xFC, | /* 416 to 423 */ |
| 0xE5, 0xD7, 0xB3, 0x7B, 0xF6, 0xF1, 0xFF, 0xE3, | /* 424 to 431 */ |
| 0xDB, 0xAB, 0x4B, 0x96, 0x31, 0x62, 0xC4, 0x95, | /* 432 to 439 */ |
| 0x37, 0x6E, 0xDC, 0xA5, 0x57, 0xAE, 0x41, 0x82, | /* 440 to 447 */ |
| 0x19, 0x32, 0x64, 0xC8, 0x8D, 0x07, 0x0E, 0x1C, | /* 448 to 455 */ |

TABLE 5-continued

Galois Exponentiation Helper Function

| | |
|---|---|
| 0x38, 0x70, 0xE0, 0xDD, 0xA7, 0x53, 0xA6, 0x51, | /* 456 to 463 */ |
| 0xA2, 0x59, 0xB2, 0x79, 0xF2, 0xF9, 0xEF, 0xC3, | /* 464 to 471 */ |
| 0x9B, 0x2B, 0x56, 0xAC, 0x45, 0x8A, 0x09, 0x12, | /* 472 to 479 */ |
| 0x24, 0x48, 0x90, 0x3D, 0x7A, 0xF4, 0xF5, 0xF7, | /* 480 to 487 */ |
| 0xF3, 0xFB, 0xEB, 0xCB, 0x8B, 0x0B, 0x16, 0x2C, | /* 488 to 495 */ |
| 0x58, 0xB0, 0x7D, 0xFA, 0xE9, 0xCF, 0x83, 0x1B, | /* 496 to 503 */ |
| 0x36, 0x6C, 0xD8, 0xAD, 0x47, 0x8E, 0x00, 0x00, | /* 504 to 511 */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, | /* zeros for fast multiply */ |
| 0x00, 0x00, 0x00, 0x00, 0x00, 0x00, 0x00, 0x00, 0x00 | /* zeros for fast multiply */ |

};

These tables can then be used to compute various arithmetic operations as described below.

Addition and subtraction in Galois Field ($2^8$) are the same operation, and are performed as follows:

$$a \oplus b = a \char`\^ b$$

$$a - b = a \char`\^ b$$

where ^ is the logical exclusive or (XOR) operator. As in ordinary arithmetic, $a \oplus 0 = 0 \oplus a = a$.

Multiplication ($a \otimes b$) in Galois Field ($2^8$) is performed as follows:

$$a \otimes b = g\exp[g \log [a] + g \log [b]]$$

where + is the ordinary addition operator. As in ordinary arithmetic, $a \otimes 0 = 0 \otimes a = 0$. Also, $a \otimes 1 = 1 \otimes a = a$.

Division ($a \div b$) in Galois Field ($2^8$) is performed as follows:

$$a \div b = g\exp[g \log [a] - g \log [b] + 255]$$

where + is the ordinary addition operator and − is the ordinary subtraction operator. As in ordinary arithmetic, $a \div 1 = a$. As is also usual, b must be non-zero.

The power function ($a^b$) in Galois Field ($2^8$) is performed as follows:

$$a^b = g\exp[(g \log [a] * b) \% 0xFF]$$

where + is the ordinary addition operator, − is the ordinary subtraction operator, * is the ordinary multiplication operator, and % is the ordinary mod function. As in ordinary arithmetic, $a^0 = 1$ for non-zero a. In the RS256 reference code, 0 is never raised to a power.

As described above, the LPR group size (in packets) can be set to achieve a desired protection period (in milliseconds). If the video codec does not use the entire channel bit rate, then the LPR group will result in a longer latency period. For example, a video channel that normally runs at 1.5 Mbps may drop to 750 Kbps in periods of light motion. This could result in a protection period twice as long as desired. Such a situation can result in the selected LPR mode continuing to meet the predetermined MTBF, which will, in this example, be exceeded by a factor of 2.

In some cases, this extended protection period can be allowed. However, this can result in a longer latency when packets are lost. Therefore, in some cases, it may be desirable for the transmitter to adjust its LPR mode as the actual video rate varies. Three such adjustments are described below, although other adjustments are also possible.

One adjustment that can be made is to the protection group size. In some embodiments, this setting can be changed at every protection group boundary. Therefore, a transmitter can monitor the LPR output packet rate and dynamically adapt the number of packets per group. When this adjustment is employed, LPR protection overhead will tend to rise as the data rate falls. However, because the data rate in such cases will typically be below the normal limit the altered LPR mode will still generally remain below a predetermined congestion ceiling.

Another adjustment that can be made is for the transmitter to change its output packet size upon transmission of an initial data packet. In general the transmitter should not change the output packet size when transmitting follow-on packets, as the number of follow-on packets will typically be signaled in the initial data packet. Therefore, a transmitter can monitor the LPR output packet rate and the output data rate and dynamically adapt the packet size to maintain the number of packets per protection period.

Another adjustment that can be made is for the transmitter to send empty data packets to complete a partial recovery set.

An empty data packet can include an initial data packet header as described above. Other information that would normally be in the packet, such as sequence number payload type, number of follow-on packets, etc., can all be set to zero. Because the empty data packets are part of the protection group, the recovery packet encoding described above can include these packets, which can also be recovered by the decoding process. Also, empty data packets can be discarded by the LPR decoder (discussed below) to prevent empty packets in the output media packet stream.

Figure 9:
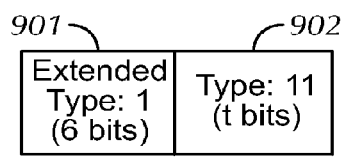

Fill packets can also be used to maintain a predetermined data rate. These fill packets can be discarded by the receiver. An example fill packet is illustrated in FIG. 9. The fill packet can include an extended type field 901 of six bits having a value of 1 and a type field 902 of two bits having a value of 11. The fill packet can be an RTP packet using the LPR payload type for the media stream. The timestamp value can be the same as the value in the previously sent RTP packet. The sequence number can be incremented from the value in the previously sent packet. The payload can end with the Fill header shown above. The payload length of the field can be any length within a maximum specified packet size.

Figure 10:
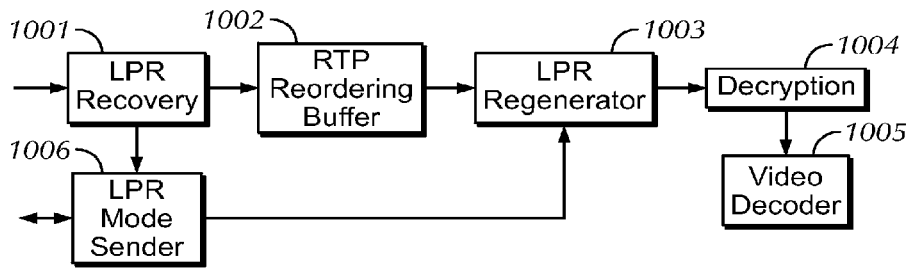
FIG. 10 illustrates a lost packet recovery decoder.
Figure 11:
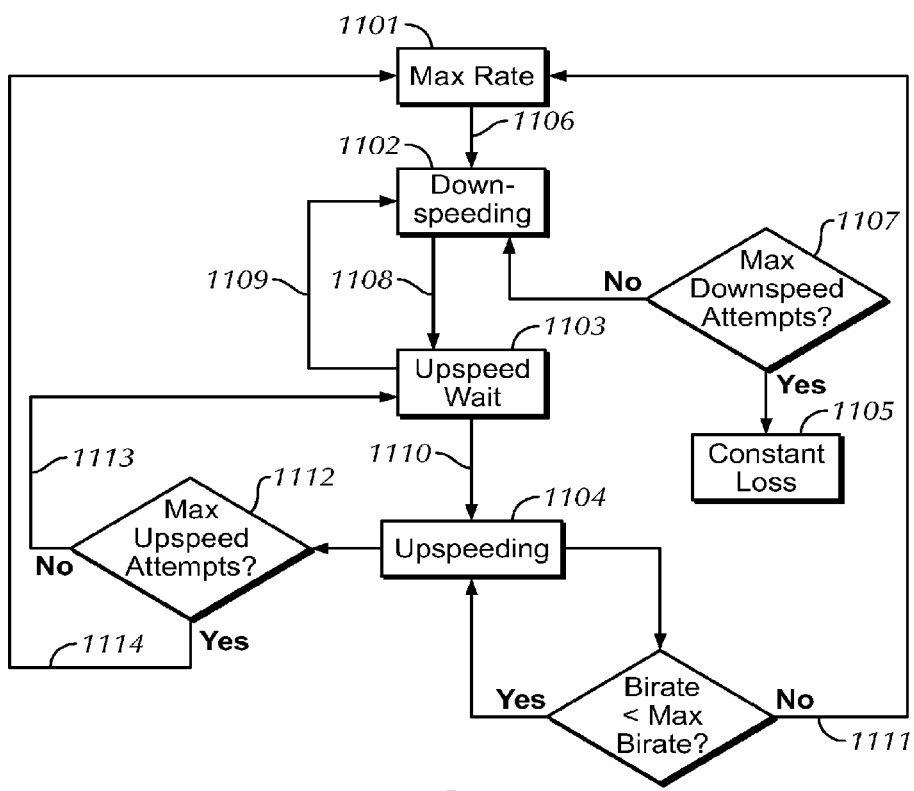
FIG. 11 illustrates a state machine for a congestion avoidance algorithm that can be used in conjunction with the lost packet recovery techniques, encoders, and decoders of FIGS. 1-10.

An example of an LPR decoder is illustrated in FIG. 10. As with the LPR encoder discussed above, variations on this embodiment are possible. Operation of the LPR decoder can be basically an inverse of the LPR encoder operation described above. Specifically, LPR packets can be recovered by LPR recovery module 1001. These recovered LPR packets can be passed to the RTP reordering buffer 1002, which can, as in conventional systems, reorder the packets into their received order. Alternatively, the packets can be reordered before the LPR recovery. LPR regenerator 1003 can then recreate any lost packets, relying on information received from the recovered LPR packets (from LPR recovery block 1001). These regenerated blocks can then be decrypted by decryption block 1004 (if encryption was used at the source), and finally the decrypted blocks can be processed by video decoder 1005 (or other type of media decoder, as appropriate).

LPR recovery module 1001 and LPR renenerator 1003 can be the only non-standard elements as compared to conventional systems, and these two modules can operate as pass-throughs when LPR is not being used.

LPR recovery module 1001 can process all LPR RTP packets. In the given example, all received and regenerated packets (data and recovery) can be directly passed through to the RTP reordering buffer. The overhead data in each data packet can allow these packets to be processed by LPR recovery module 1001 in any order. LPR recovery module 1001 can also provide LPR RTP receiver report information to LPR Mode Receiver 1006. This information can be based on what is received (e.g., any packets that are not recovered can be identified as lost in the receiver report).

If there are missing data packets in the recovery set that can be recovered, the LPR recovery module can recover these packets as soon as sufficient recovery packets have been received. As discussed above, if k data packets are missing, k recovery packets must be received to recover the data. This recovery process can involve first recovering the marker bit, the data packet length, the initial packet flag, and the original timestamp. The data packet length can be used to recover the original data packet payload. "Fixed" components of the LPR RTP header (e.g., SSRC, CSRC, LPR payload type, etc.) can be taken from one of the recovery packets. Variable portions of the LPR RTP header (e.g., marker bit, timestamp, and sequence number) can be set to the values recovered from the recovery header.

The sequence number for LPR data packet i can be computed according to the following equation:

$$S_i = S_r - (d+r-i)$$

where: i is the index recovered data packet, d is the number of data packets in the recovery set, r is a received recovery packet index, and $S_i$ is the sequence number for packet i.

While receiving data packets, partial recovery packets can be built up by recovery module 1001, using the RS256 generation function described above. As corresponding recovery packets for the set are received, these packets can be exclusive-or'ed (i.e., XOR'd) with the partial recovery packet. The resulting residual packets will hold the contribution of any lost data packets to each recovery packet. In the exemplary system, each residual packet will be a linear combination of each of the missing data packets. Thus, there will be k simultaneous equations (one for each of the k residual packets), each with k unknowns (one for each of the missing k data packets).

As would be understood by one skilled in the art, these equations can be represented as a k×k matrix, which can then be solved numerically, e.g., by Gaussian elimination. Because such operations are well-known, the details are not reproduced herein. Multiplying the resulting inverted matrix by the residual data can then recover the missing data packets.

To illustrate the above recovery process, the recovery scenario in FIG. 2 can be performed. For clarity ordinary arithmetic operations are used rather than the actual Galois Field ($2^8$) operations. The data in the recovery packets can generated using the following formula (derived from the RS256 generation function and tables described above:

$$R_1 = D_1 + D_2 + D_3 + D_4 + D_5 + D_6$$

$$R_2 = 2D_1 + 4D_2 + 6D_3 + 9D_4 + 13D_5 + 14D_6$$

The partial recovery packets can be computed by the decoder on the packets that are received. As noted in the example above, packets 3 and 4 (108, 110, FIG. 3) are not received. This results in:

$$P_1 = D_1 + D_2 + D_5 + D_6$$

$$P_2 = 2D_1 + 4D_2 + 13D_5 + 14D_6$$

Residuals can be computed by subtracting the partial recovery packets from the received recovery packets:

$$r_1 = R_1 - P_1 = D_3 + D_4$$

$$r_2 = R_2 - P_2 = 6D_3 9D_4$$

The generating matrix for the residuals is therefore:

$$\begin{matrix} 1 & 1 \\ 6 & 9 \end{matrix}$$

Inverting this matrix via Gaussian elimination results in the following:

$$\begin{matrix} 3 & -1/3 \\ -2 & 1/3 \end{matrix}$$

Therefore, the information in the missing data packets (i.e., data packets 3 and 4) can be recovered using the formulas:

$$D_3 = 3r_1 - r_2/3$$

$$D_4 = -2r_1 + r_2/3$$

When LPR is in use, RTP reordering buffer 1002 can be integrated with the LPR decoder. This can permit a minimal delay implementation, because in some situations out-of-order packets can be regenerated by LPR before they actually arrive. Additionally, in some embodiments it may be desirable to acquire the first d packets of the recovery set, running the Reed-Solomon decoder only if some data packets were lost. This design may not produce minimal delay, but can be more computationally efficient.

LPR regenerator module 1003 can recreate the original RTP stream from the data packets as was described above. If some data packets for an RTP packet are missing, then that RTP packet is omitted from the output stream. Because the LPR stream has been re-ordered, the initial packet from each packet set should be received first. If a follow-on packet is encountered first, then the initial packet has been lost, and the follow-on packet can be discarded.

The output RTP packet uses the RTP header information of the initial data packet. The payload type, sequence number, and timestamp are replaced with the values in the initial data header. The payload is aggregated from the initial packet and any follow-on data packets with the LPR headers removed. If any follow-on packets are missing the output RTP packet can be suppressed. It should be noted that the number of follow-on packets can be known because it can be signaled in the initial data packet header.

Lost packet recovery techniques, like those described above, can be combined with congestion avoidance algorithms to further enhance operation. An example congestion avoidance algorithm is referenced above and is referred to as Dynamic Bandwidth Allocation ("DBA"). DBA can attempt to avoid congestion by downspeeding the bitrate based on the percent packet loss reported by the receiver's RTP stack (1006, FIG. 10). The receiver RTP stack generates packet loss statistics for the receiver channel during regular time periods (e.g., every 200 ms). This can allow fast adaptation to a dynamically changing pipe while allowing for minimal LPR configurations with low MTBF requirements (which, in turn can allow for lower overhead).

Figure 12:
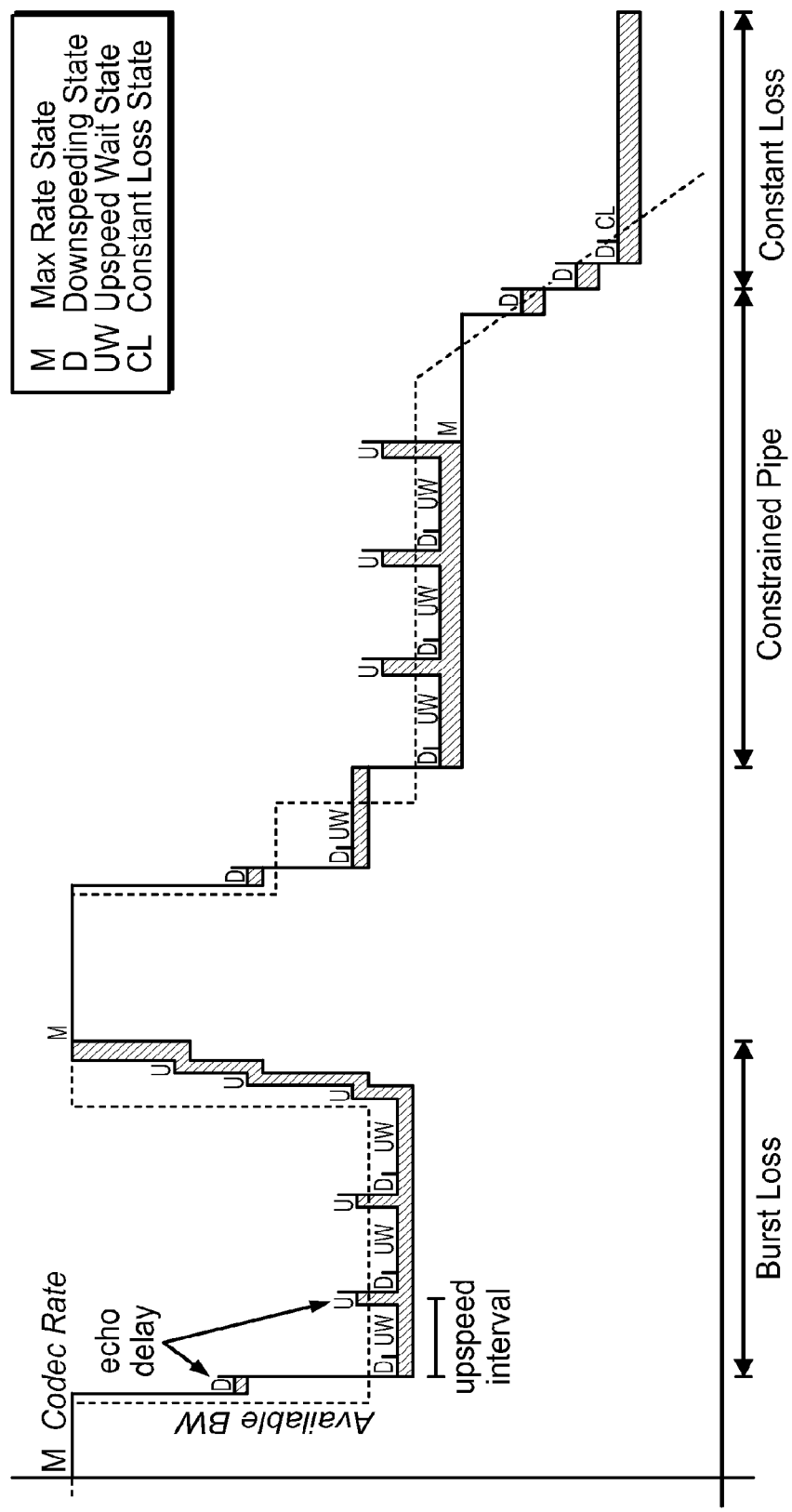
FIG. 12 illustrates a data rate for an encoder employing lost packet recovery and congestion avoidance using techniques, encoders, decoders and algorithms according to FIGS. 1-10.

As illustrated in FIG. 12, the control loop for DBA can be implemented as a state machine with the following states: max rate state 1101, downspeeding state 1102, upspeed wait state 1103, upspeeding state 1104, and constant loss state 1105. The various state transitions can be understood as follows. Suppose the system is in the max rate state 1101, meaning that the maximum data rate is being used. A packet loss above a predetermined threshold can cause state transition 1106 to downspeeding state 1102.

While in the downspeeding state, the system can decrease the speed and wait to see whether packet loss above the predetermined threshold continues to be experienced. If there is no more packet loss above the threshold, the system can follow transition 1108 to the upspeed wait state. If there continues to be packet loss above the threshold, and the maximum number of downspeed attempts have not been used (block 1107), the system can continue in the downspeeding state 1102 and can thus continue decreasing the bitrate. If the maximum number of downspeeding attempts has been used, the system can transition to constant loss state 1105.

While in the upspeed wait state, additional packet loss above the predetermined threshold can cause the system to follow transition 1109 to the downspeeding state. Alternatively, if, after a predetermined period of time, there is no packet loss above the threshold, the system can follow transition 1110 to the upspeeding state 1104.

In the upspeeding state 1104, the system can increase the bitrate and wait for additional packet loss above the predetermined threshold. If there is no packet loss, the system can determine whether the bitrate is less than the maximum bitrate. If not, the system can follow state transition 1111 to the maximum rate state 1101. If so, the system can continue in the upspeed state 1104. If packet loss above the predetermined threshold is experienced while in upspeed state 1104, the system can determine whether a predetermined maximum number of upspeed attempts have been made (block 1112). If not, the system can follow transition 1113 to the upspeed wait state. If the maximum number of upspeed attempts has been used, the system can follow transition 1114 to the max rate state 1101.

In each of the states described above, different packet loss thresholds may be employed. Additionally, some or all state transitions may have a delay associated with them. Upspeeds can be done in 15% step increases of the bit rate. If the pipe is fully utilized and no packet loss is reported, a delay can be incurred which can be equal to X timer cycles (200 ms*X) before the next upspeed will occur. By default the value of X can be set to 2, resulting in a 400 ms delay. Any packet loss that is not a sequential packet loss report and not an echo report can cause a state transition.

FIG. 12 shows dynamically changing bandwidth availability and the DBA adaptation. FIG. 12 also shows the state transitions, echo delays, along with three generalized loss scenarios: Burst Loss, Constrained Pipe, and Constant Loss. LPR protection use is designated in FIG. 12 by the shaded area during the downspeeding state, the upspeed wait state, and the upspeeding state. The upspeed attempts can use the LPR protection overhead to test for the congestion ceiling, i.e., only "redundant" data may be used to probe whether network congestion conditions would permit a higher bitrate. If this test of the congestion ceiling fails, LPR protects any loss caused by the packet loss incurred because only "redundant" data has been used. This allows probing of the congestion ceiling with substantially reduced risk of video disruption.

The measured congestion ceiling can be applied to the data flow in its entirety. For example, when multiple video streams are being sent, the congestion ceiling can apply to the aggregated bit rate. Forward erasure protection can be applied independently to each video stream. However, the same level of protection can be applied to all streams. The system can also be adapted to jointly protect the video streams with common forward erasure protection packets or to apply different levels of protection to each video stream.

Forward erasure correction can also be applied to just a part of the video stream. For instance, in cases where layered video encoding is employed, the forward erasure protection could be applied to the base layer but not the enhancement layers. It could also be adapted to protect the various layers to different degrees (so called "unequal protection"). In these configurations, the congestion avoidance applies to the entire data flow.

Example LPR probes for congestion ceiling management are given in Table 6. These probes can be used to test the possibility of raising the data rate by a predetermined value (e.g., 10%) and can be activated for short periods of time (e.g., 800 ms).

TABLE 6

Probe for a 10% Rate Up-speed

| Video Rate (k\bs) | Data Packets Per Group | Packet Payload Size (bytes) | Recovery Packets Per Group | Protection Period (ms) | MTBF (ms) |
| --- | --- | --- | --- | --- | --- |
| 64 | 13 | 87 | 3 | 141 | 2067 |
| 128 | 12 | 133 | 3 | 100 | 1795 |
| 256 | 12 | 266 | 3 | 100 | 1795 |
| 384 | 12 | 400 | 3 | 100 | 1800 |
| 512 | 12 | 533 | 3 | 100 | 1799 |
| 768 | 12 | 800 | 3 | 100 | 1800 |
| 1024 | 16 | 800 | 3 | 100 | 870 |
| 2048 | 16 | 800 | 4 | 50 | 1158 |
| 3072 | 24 | 800 | 6 | 50 | 1936 |
| 4096 | 32 | 800 | 7 | 50 | 1365 |
| 5120 | 32 | 1000 | 7 | 50 | 1365 |
| 6144 | 39 | 1000 | 8 | 51 | 1235 |

The techniques described herein can be receiver-driven, in that the receiver feeds back the congestion ceiling and erasure protection level to the sender. Alternatively, they can also be used in a transmitter-driven framework, or even in a hybrid framework where the control loop is distributed between sender and receiver. With some adaptation, it is also suitable for use with multicast streams. The techniques described also can be combined with other techniques such as packet retransmission, periodic picture refresh, and video error concealment.

As described above, the combination of forward erasure correction with congestion avoidance offers unique benefits that neither mechanism can achieve on its own. One such benefit is that congestion ceiling can be periodically measured by experimentally increasing the amount of forward erasure protection packets in the bitstream and observing the effect on the delivered data flow. These protection packets increase the overall data rate to a desired "probe" level while simultaneously protecting the media from packet loss (in case the level exceeds the congestion ceiling). A second benefit is that this method of dynamically measuring the congestion ceiling can result in a much faster determination of the allowable bandwidth than that provided by the passive methods normally employed in congestion avoidance algorithms. A third benefit is that the protected media flow can be delivered with less delay and lower protection overhead when the entire flow (media and protection) is constrained to stay below the dynamically measured congestion ceiling.

An additional benefit of the techniques described herein arises in that as the video data rate increases, the system can become more and more efficient at protecting against packet loss. Therefore, as bitrates increase, such as with the use of high definition video, the techniques described herein become both more useful and more efficient.

The integration of congestion avoidance with forward erasure correction offers several unique advantages. For example, congestion avoidance brings several unique advantages to forward erasure correction. As a data link becomes congested, the transmission delay for media along that link increases. Using forward erasure correction alone may result in an acceptable packet loss rate, but will not reduce queueing delays. Integrating congestion avoidance into the control loop results can achieve a desired quality of service (QoS) with much lower latency. Additionally, the efficiency of forward erasure protection is less for low-latency applications than it is for high-latency applications. If the source of the data loss is simple congestion, reducing the bit rate can be more efficient than adding additional forward erasure protection packets to the data flow.

Conversely, forward erasure correction can also add considerable value to congestion avoidance alone. Congestion avoidance techniques typically reduce the rate of the data flow more aggressively then they raise it. For example, the congestion mechanism for TCP reduces the data rate by a multiplicative factor, but raises it much more slowly by applying an additive factor. The reason for this is that increasing the data flow rate always risks creating congestion, and therefore creating packet loss. When forward erasure protection is integrated with the congestion avoidance, this risk is greatly reduced. Thus, as noted above, the data rate can be increased by simply increasing the density of forward erasure protection packets.

Additionally, congestion avoidance techniques also are designed to estimate the link speed. Cross-congestion from other data flows can frequently result in packet loss. By the time the cross-congestion is observed, packet loss has usually already occurred. Including forward erasure protection allows packets lost due to such cross-congestion to be recovered.

The techniques disclosed herein can be employed in a wide variety of systems, including any systems for the transmission of multimedia data, such as video data, audio data, still image data, and other types of data. Such techniques can be employed in typical general purpose computer systems, such as desktop computers, notebook computers, handheld computers, servers, and the like. Alternatively, these techniques can be employed in various appliance-type systems such as conference room videoconferencing systems, desktop videoconferencing systems, and the like. The techniques described can also be employed in infrastructure type videoconferencing devices such as multi-point control units (MCUs), bridges, media servers, etc.

The methods described herein can be coded into one or more computer programs and stored on a computer-readable media, such as a compact disk, a tape, stored in a volatile or non-volatile memory, etc. Accordingly, instructions stored on a program storage device can be used to cause a programmable control device (e.g., computer or conferencing unit) to perform the techniques disclosed herein. Although the disclosed communication system has been described as providing bi-directional communication between a near end and a far end, it will be appreciated that the teachings of the present disclosure are applicable to systems that provide one-way transmission.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A method of preventing disruption of a media stream transmitted across a lossy network, the method comprising:
    applying a lost packet recovery algorithm to the media stream, wherein the lost packet recovery algorithm inserts redundant information into a transmitted data stream including the media stream to permit reconstruction of one or more lost packets; and
    applying a congestion avoidance algorithm to the transmitted data stream, wherein the congestion avoidance algorithm, if there has been no packet loss above a first predetermined threshold for a predetermined period of time:
        temporarily increases a data rate of the transmitted data stream by increasing the amount of redundant information inserted into the transmitted data stream;
        receives channel information from the network including packet loss and monitoring the packet loss to determine whether the network can support the higher data rate of the transmitted data stream; and
        if the packet loss remains below a second predetermined threshold, increases a bit rate of the media stream while maintaining the higher data rate of the transmitted data stream.

2. The method of claim 1 wherein the redundant information comprises one or more recovery packets.

3. The method of claim 2 wherein the number of recovery packets depends on the packet loss determined from RTCP receiver reports.

4. The method of claim 1 wherein the lost packet recovery algorithm includes:
    forward erasure correction coding; or
    Reed-Solomon encoding.

5. The method of claim 1 wherein the media stream comprises video data.

6. The method of claim 1 wherein applying a lost packet recovery algorithm to the media stream comprises:
    determining a protection period;
    determining a total number of packets per protection period; and
    determining a number of recovery packets per protection period.

7. The method of claim 6 wherein the protection period is determined according to the bit rate of the media stream.

8. The method of claim 6 further comprising adjusting lost packet recovery protection parameters, LPR protection parameters, as a function of the bit rate of the media stream.

9. The method of claim 8 wherein adjusting LPR protection parameters as a function of the bit rate of the media stream comprises:
    dynamically adapting the packet size of the data and/or recovery packets; or
    sending empty data packets.

10. A media encoding apparatus for preventing disruption of a media stream transmitted across a lossy network, the media encoding apparatus comprising:
    a media encoder; and
    one or more lost packet recovery modules, wherein the one or more lost packet recovery modules comprise a programmable control device and a memory, the memory being configured to store and the programmable control device being configured to execute instructions causing the meia encoding apparatus to:
    insert redundant information into a transmitted data stream including the media stream to permit reconstruction of one or more lost packets; and
    if there has been no packet loss above a first predetermined threshold for a predetermined period of time:
        temporarily increase a data rate of the transmitted data stream by increasing the amount of redundant information inserted into the transmitted data stream;
        receive channel information from the network including packet loss and monitor the packet loss to determine whether the network can support the higher data rate of the transmitted data stream; and
        if the packet loss remains below a second predetermined threshold, increase a bit rate of the media stream while maintaining the higher date rate of the transmitted data stream.

11. The media encoding apparatus of claim 10 wherein the media encoding apparatus is further configured to determine lost packet recovery protection parameters, LPR protection parameters, from the channel information.

12. The media encoding apparatus of claim 10 wherein the media encoding apparatus is a video encoder.

13. The media encoding apparatus of claim 10 wherein the LPR protection parameters are determined by:
- determining a protection period;
- determining a total number of packets per protection period; and
- determining a number of recovery packets per protection period.

14. The media encoding apparatus of claim 10 wherein a payload of the recovery packet is encoded using Reed-Solomon encoding.

* * * * *